Jan. 24, 1956   R. W. HARROUN ET AL   2,732,222
BALL AND SOCKET TYPE VEHICLE COUPLING
Filed March 16, 1953   2 Sheets-Sheet 1

INVENTORS
RAY W. HARROUN
BY CARL J. WAGNER

*Whittemore Hulbert + Belknap*

ATTORNEYS

Jan. 24, 1956    R. W. HARROUN ET AL    2,732,222
BALL AND SOCKET TYPE VEHICLE COUPLING
Filed March 16, 1953    2 Sheets-Sheet 2

INVENTORS
RAY W. HARROUN
BY CARL J. WAGNER

ATTORNEYS

United States Patent Office 2,732,222
Patented Jan. 24, 1956

2,732,222

BALL AND SOCKET TYPE VEHICLE COUPLING

Ray W. Harroun and Carl J. Wagner, Sturgis, Mich., assignors to Marvel Industries, Inc., Sturgis, Mich., a corporation of Michigan Application March 16, 1953, Serial No. 342,428

1 Claim. (Cl. 280—512)

The invention relates to coupling means for the attachment of trailers to draft vehicles and forms an improvement on the construction shown in the patent to C. J. Wagner, 2,435,024, issued January 27, 1948. The construction forming the subject matter of this patent consists essentially of a spherical bearing attached to and projecting upward from the draft vehicle and a segmental spherical socket member attached to the trailer and downwardly engageable with the spherical bearing on the draft vehicle. The socket member has a rigid portion which is only one-half of a sphere so as to be freely engageable with the sphere of the tractor member. There is, however, a rock arm pivotally attached to this socket member and provided with a segmental spherical bearing for pressing against the lower portion of the tractor sphere to hold it from disengagement. A spring holds the segment in position after coupling and a cam lever and link attachment between the same and said rock arm forms a means for retracting the bearing during coupling and uncoupling.

The construction as above described forms a satisfactory trailer hitch, permitting of easily coupling or uncoupling the trailer and also under normal conditions will hold the parts coupled during travel of the vehicle. However, under exceptional conditions, such as a very heavy road shock or sudden stopping of the vehicle, there is danger of disengagement of the coupled members. This may prove dangerous, especially if the vehicle is travelling at the time that the trailer is released.

It is the object of the invention to obtain an improved trailer hitch of this general type in which the coupling is positively locked from accidental release. To this end the invention consists in the construction as hereinafter set forth.

Figure 1:
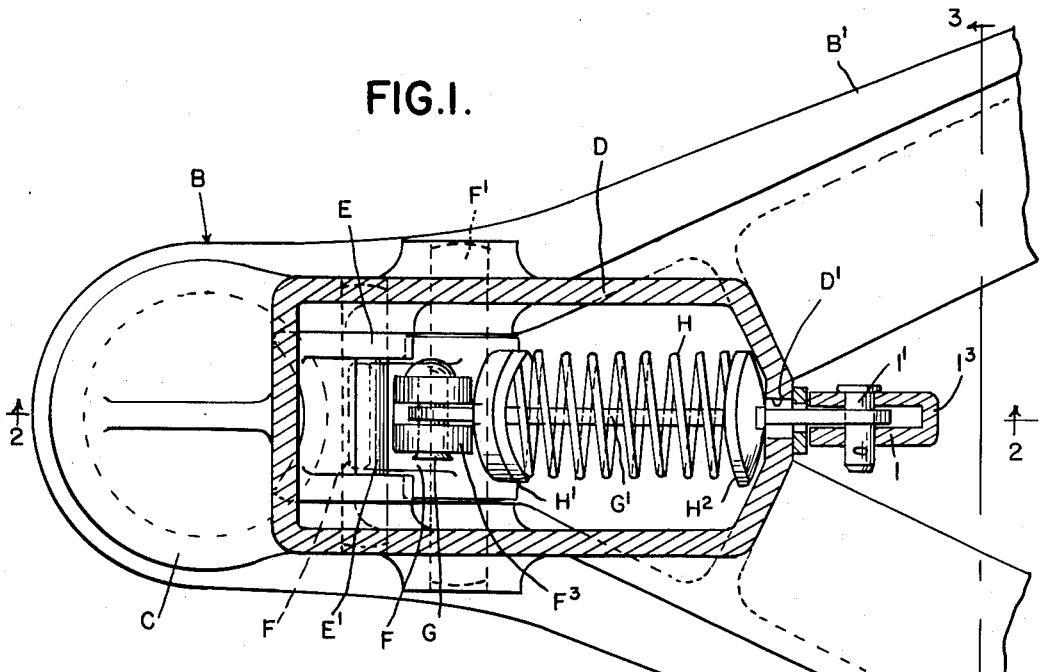
Fig. 1 is a plan view partly in horizontal section substantially on line 1—1, Fig. 2, of my improved coupling.
Figure 3:
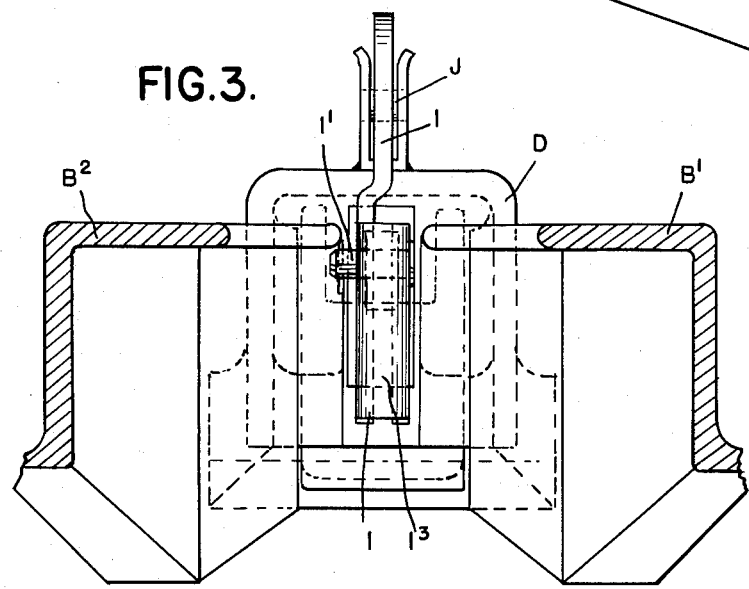
Fig. 3 is a cross-section on line 3—3, Fig. 1.
Figure 2:
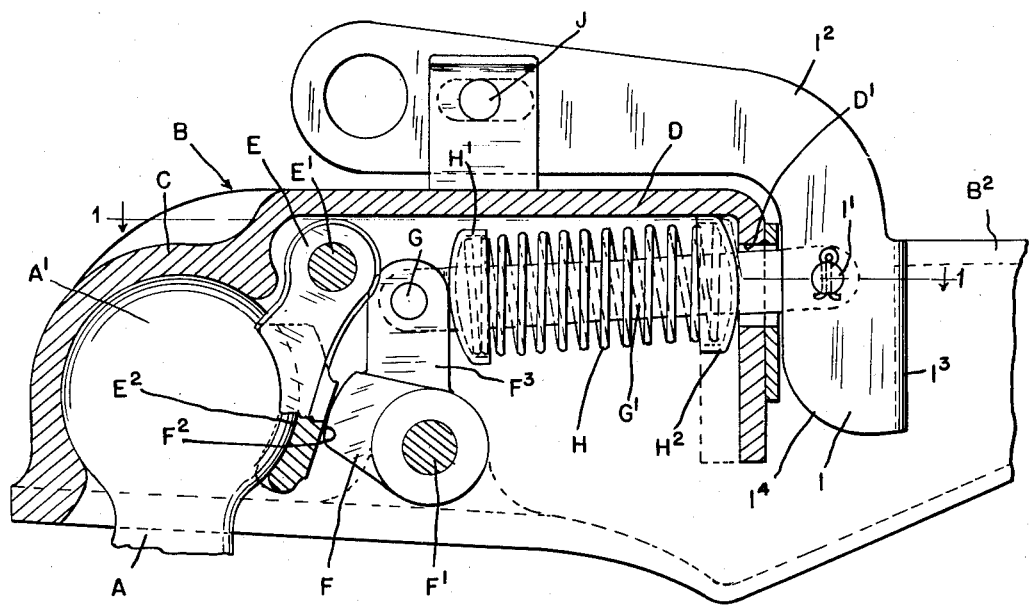
Fig. 2 is a vertical section substantially on line 2—2, Fig. 1.

As shown in Fig. 2, A is the coupling member attached to the tractor which has an upwardly extending spherical head portion A' and any suitable means (not shown) for attachment to the tractor. B is the trailer coupling member, preferably a forging or casting, provided with the rearwardly extending flaring arms B' and B² for attachment to the trailer draft bars (not shown). The forward portion of the member B is formed with a downwardly opening semispherical socket portion C, preferably located above and forward of an inclined transverse plane. In rear of this socket portion is a housing portion D for enclosing the operating mechanism. This mechanism includes a rock-arm E pivotally attached at its upper end to a cross pin E' and at its lower end having a segmental spherical portion E² complementary to the socket C and together therewith extending over more than half the sphere. To the rear of the member E is a second rock-arm F mounted on a heavy pin F' extending transversely of and anchored in the housing D. The arm F has its forward face F² concentric with the axis of the pin F'. This face is adapted to bear against the rear face of the rock-arm E when the spherical portion E² thereof is in position complementary to the socket C, and lines from said point of bearing to the axes of the pins E' and F' are at an angle of ninety degrees to each other. Thus in the position shown in Fig. 2, the arm E is positively locked against any movement which would retract the spherical bearing E² and permit disengagement of the spherical head A'. The arm F has an upwardly extending bifurcated lug F³ to which is attached by the pivot G a link G' extending rearward and outward through an aperture D' in the housing D. A coil spring H is sleeved upon the link G' and has its opposite ends engaging cup shaped members H' and H², the former bearing against the lug F³ and the latter against the rear wall of the housing D. I is a bifurcated lever in rear of the housing D embracing the rear end portion of the link G' and connected thereto by a pivot pin I'. One of the furcations I² of this lever extends upward and forward over the housing D and both furcations which are connected by the rear portion I³ are curved at their lower ends to form cam portions I⁴. The construction is such that if the lever is lifted and swung rearward around the pivot I' the cam portions I⁴ will draw the link G' rearward, rocking the arm F and compressing the spring H. This will withdraw the curved face F² from the rear face of the rock arm E so as to permit the latter to rock rearward providing clearance for the engagement and disengagement of the spherical head A' from the socket C. When the lever is thus turned through an angle of ninety degrees it will hold the link G' and attached parts at retracted position. When, however, the leved is moved forward over the housing D, the arm F will be rocked downward, moving the arm E forward until the bearing E² is in complementary position to the socket C. To prevent any accidental movement of the lever I by road shocks a bifurcated lug projecting upward from the housing D embraces the forward portion of the lever and registering apertures in this lug and the lever permit of insertion of a locking pin J.

In operation when the trailer is to be hitched to the tractor vehicle the lever I is swung rearward to compress the spring H and rock the arm F out of the path of the arm E. In this position of the parts the member B may be dropped over the spherical head A' of the member A. The lever I is then swung back to its forward position, turning downward the arm F and locking the segmental bearing E² as above described. The pin J will retain the lever in this position and consequently it will be impossible for the spherical head A' to be accidentally disengaged from the spherical socket member by any force less than that which would break the structure.

It will be noted that the ball A' in disengaging from the semi-spherical socket C is compelled to move rearward and downward inasmuch as said socket is forward and above an inclined plane. Also, that a line from the axis of the pivot F' of the arm F to the center of the ball A' is upwardly and forwardly inclined. Thus, no matter how great the force tending to disengage the ball from its socket, it will not effect an unlocking of the segment E².

What I claim as my invention is:

In a trailer hitch, a coupling member having a segmental spherical projection which is greater in extent than one-half of a sphere, a cooperating coupling member having a rigid segmental spherical socket which is no greater in extent than one-half a sphere and is adapted to receive and fit the aforesaid spherical member, a member movably attached to said cooperating member having a segmental spherical socket bearing portion which in one position thereof is complementary to said rigid socket to form therewith more than one-half of a sphere embracing the spherical portion of said first mentioned member, and means for positively locking said bearing member in its complementary position, said member having a spherical socket bearing being a rock arm pivotally attached to said cooperating member to swing from its complementary position to a position clearing entrance to said fixed socket, a second rock arm pivotally attached to said cooperating member to move said first mentioned rock arm into its complementary position and forming the means for positively locking it in such position, a link pivotally connected at one end to said second rock arm, a lever connected to the opposite end of said link to move the same and said second arm to clear position, and a spring for moving the link in its opposite direction and said second arm into locking engagement with said first arm.

References Cited in the file of this patent

UNITED STATES PATENTS

| | | |
|---|---|---|
| 1,757,009 | Dumond | May 6, 1930 |
| 2,061,234 | Hoflich | Nov. 17, 1936 |
| 2,070,884 | Claus | Feb. 16, 1937 |
| 2,125,611 | Hennicke | Aug. 2, 1938 |
| 2,170,980 | Thorp et al. | Aug. 29, 1939 |
| 2,399,746 | Klaus et al. | May 7, 1946 |
| 2,435,024 | Wagner | Jan. 27, 1948 |
| 2,459,448 | Murray | Jan. 18, 1949 |
| 2,613,948 | Klein | Oct. 14, 1952 |

FOREIGN PATENTS

| | | |
|---|---|---|
| 553,337 | Germany | June 24, 1932 |